Feb. 14, 1939.                    W. E. BAHLS                    2,147,418
METHOD OF ASSEMBLING LEAD-IN CONDUCTOR SEALED THROUGH METALLIC CASING
Original Filed Oct. 21, 1936        2 Sheets-Sheet 1
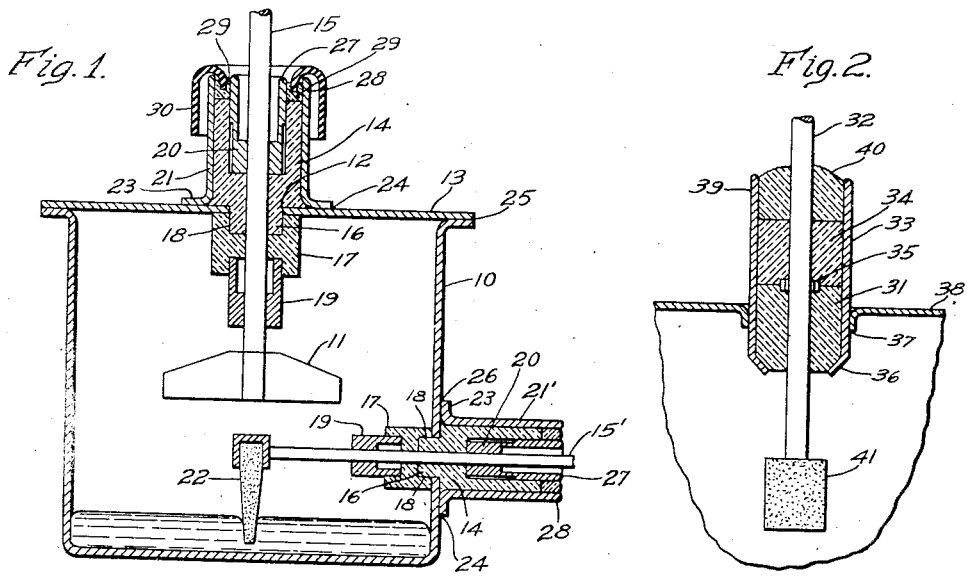
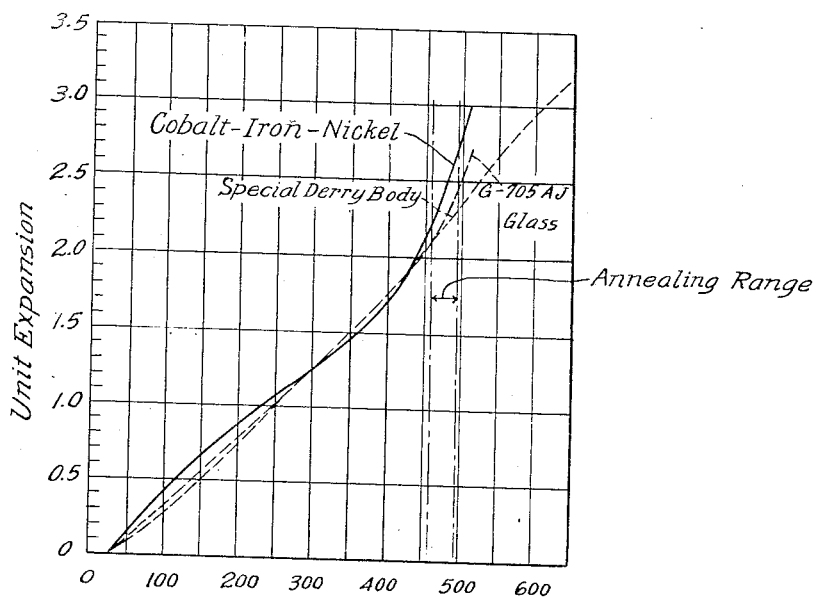
WITNESSES:
C. J. Weller.
R. W. Bailey
INVENTOR
Walter E. Bahls.
BY
F. W. Lyle.
ATTORNEY Feb. 14, 1939.  W. E. BAHLS  2,147,418

METHOD OF ASSEMBLING LEAD-IN CONDUCTOR SEALED THROUGH METALLIC CASING

Original Filed Oct. 21, 1936   2 Sheets-Sheet 2

WITNESSES:
C. J. Welles
R. W. Bailey

INVENTOR
Walter E. Bahls.
BY F. W. Lyle
ATTORNEY

Patented Feb. 14, 1939

2,147,418

UNITED STATES PATENT OFFICE 2,147,418

METHOD OF ASSEMBLING LEAD-IN CONDUCTOR SEALED THROUGH METALLIC CASING

Walter E. Bahls, Forest Hills, Pa., assignor to Westinghouse Electric & Manufacturing Company, East Pittsburgh, Pa., a corporation of Pennsylvania Original application October 21, 1936, Serial No. 106,798. Divided and this application February 20, 1937, Serial No. 126,880

1 Claim. (Cl. 250—27.5)

My invention relates to a vacuum-tight insulated lead-in construction and especially such construction applied to electron discharge devices.

This application is a division of a parent application filed October 21, 1936, Serial No. 106,798, for Vacuum-tight insulated lead-in structures.

An object of my invention is to provide a very strong vacuum-tight lead-in structure that will withstand a great difference of pressure on opposite sides thereof.

Another object of the invention is to permit baking out or heat treatment of the apparatus without having the seals leak or collapse at temperatures where the glass may become soft.

Another object of my invention is to provide a lead-in construction for vacuum devices which will permit the application of high temperature such as that necessary for copper sweating the joints of the casing, and which will then allow the device to be sealed vacuum-tight.

Other objects and advantages of my invention will become apparent from the following description and drawings, in which:

Figure 1 is a view mainly in cross-section of a preferred application of my invention to a discharge device;

Fig. 2 is a view in cross-section of a modification of the lead-in construction of Fig. 1;

Figs. 4 and 5 are curves illustrating the unit expansion of preferred materials utilized in the preceding seal construction.

Figure 3:
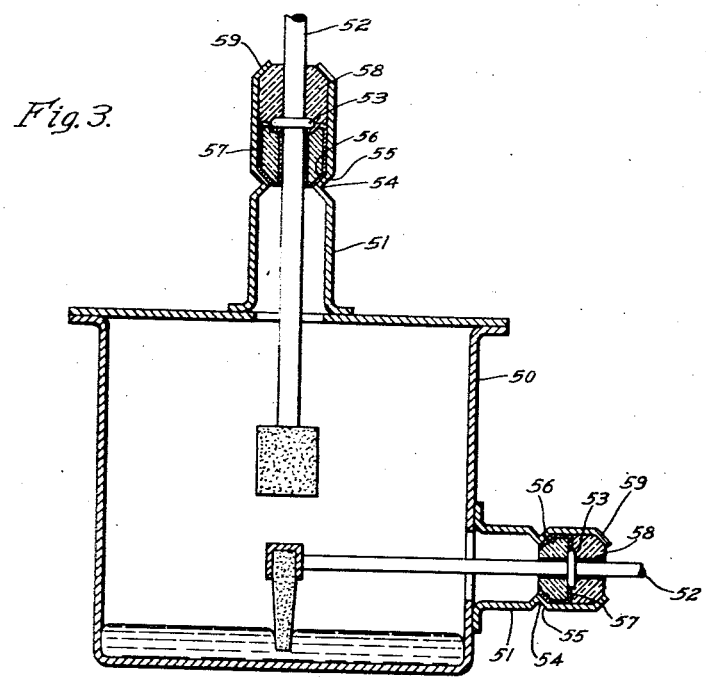
Fig. 3 is a still further modification of the invention as applied to a discharge device.

In the prior art devices employing seals between lead-ins and metal containers, a glass has been heretofore utilized. In such constructions, principally that of vacuum electric discharge tubes, it is necessary that the device be heat treated at a very high temperature in order to degasify the interior elements. An extensive portion of the glass wall cannot be utilized with such heat treatment because the glass will become molten and collapse. On the other hand, if not much glass is used, there is apt to be a very short distance between the lead-in and the metal wall of the container that will provide a leakage path with the accumulation of dirt and moisture.

It is an object of my invention to utilize a ceramic material for the body of insulating material and to utilize a coating of glass to seal the ceramic material to the metal casing. I also contemplate using special forms by which the device will withstand pressure from within and without.

Sometimes it is found desirable in the construction of metal tubes, for example, to assemble all the parts and then copper sweat the vacuum-tight joints. In a case of this sort, it is necessary to have the leads come in through insulation. This type of assembly, however, presents a difficulty because of the decomposition of the glass glaze under the conditions for making the copper sweat joints. I have devised a structure in which the joints can be copper sweated and the parts cemented together with a high temperature cement or mechanically clamped. This structure is thus held rigidly in place while it is heated up to the temperature necessary to melt the copper or whatever metal may be necessary for the sweating process. After the sweating has been done, the glass may be put on to make the lead-in construction vacuum-tight.

In Fig. 1 is disclosed a lead-in construction in which my invention is applied to the mercury pool type of discharge device. This device has a metal container 10, and it is desired to have an insulated lead-in for the anode 11 through an opening 12 in the metal casing. I prefer to have the opening in a separate metal top 13 for ease in assembling. I place an insulator tube 14, preferably of porcelain, around the anode lead 15, and this porcelain tube preferably has an extension 16 extending through the opening 12 to the interior of the casing. Another porcelain tube 17 surrounds the portion of the anode lead just within the casing and has a depression 18 into which the extension 15 of the outer porcelain piece fits. A metal portion 19 on the interior portion of the anode lead and a similar portion 20 on the exterior portion of the anode lead tightly clamps the two porcelain sections 14 and 17 together about the opening 12 in the top cover 13 of the tube. This arrangement is assembled preferably by first spot welding the metal portion 20 in place on the anode lead 15, then placing the other parts thereon and spot welding the metal part 19 while the parts are held tightly in position. A tubular section 21 preferably surrounds the exterior portion of the tube 14. This tubular section is preferably of an alloy of 24% to 30% nickel, 5% to 25% cobalt, less than 1% manganese, and the remainder iron or essentially iron. The metal piece 20 is also preferably of this alloy. A similar construction may be utilized for any auxiliary electrode such as the make-alive 22 illustrated.

The metal tubular extension 21 has a flange 23 resting upon the cover 13 making a joint 24 therewith. The cover 13 likewise has a joint 25 with the main body of the casing 10. Likewise, the tubular part 21' about the auxiliary electrode connection 15' has a joint 26 with the metal casing. These metal joints are then sweated together at the points 24, 25 and 26, preferably by the copper sweating process. The joint between the lead 15 and the metal piece 20 is also sweated. After this is done, the pocket formed by the extensions 27 of the interior metal portion 20 and the upper portion 28 of the flange or tubular extension 21 is filled with a glass material 29 to provide a vacuum-tight seal across the upper surface of the porcelain. This glass is preferably of the boro-silicate type of glass. This glass has a major percentage of silicon dioxide and also preferably has such silicon dioxide in an amount from 65% to 75%. This glass also has preferably less than 10% PbO, less than 6% $Al_2O_3$, and 10% to 25% $B_2O_3$. The particular type of glass that I prefer to use has the following analysis:

|  | Per cent |
|---|---|
| $SiO_2$ | 67.3 |
| $B_2O_3$ | 24.6 |
| $Al_2O_3$ | 1.73 |
| $Na_2O$ | 4.6 |
| $K_2O$ | .94 |
| $As_2O_3$ | .14 |

In case it is desired to increase the creepage distance between the metal portions 20 and 21, an insulator 30 which may have any desired shape, such as a form of a ring having a reversed bend, is sealed into the glass 29.

Since the temperature at which the junctions in the casing were sweated is well above the annealing temperature of the glass, insertion of the glass in contact with the ceramic insulator soon after the joints are sweated makes it possible to complete the vacuum-tight glass seal before the assembly has cooled below said annealing temperature, and thereby makes it possible to complete the entire sweating and sealing of the casing without having to heat the assembly a second time.

Fig. 2 discloses another modification in which the porcelain section 31 is placed on lead-in 32 and enclosed in a tubular shell 33. The porcelain section 34 is then placed on the lead-in and cemented in position to shell 33. The lead 32 preferably has a raised or ring portion 35 upon which the two porcelain portions 31 and 34 clamp. The shell 33 preferably has the tapered flange 36 to maintain the lower porcelain section in position. The shell 33 is preferably of the nickel-cobalt-iron alloy previously disclosed, and is preferably copper sweated at 37 to the container wall 38. The lead 32 or its collar, or both, is also preferably of the nickel-cobalt-iron alloy. Thereafter, the upper portion 39 of the nickel-cobalt-iron shell is filled with a sealing glass material 40 to provide a vacuum-tight seal between the anode lead 32 and the shell portion 33 which forms an extension of the metal casing. An interior electrode 41 is utilized according to the device to which the invention is applied. In the present instance, an anode for a discharge device is illustrated.

Fig. 3 illustrates a type of device in which the lead-in combines all the features of mechanical clamping as well as the sealing of the metal, glass and porcelain. The metal casing 50, which, of course, may contain one or more pieces, has a tubular extension 51 welded or copper-sweated thereto. The anode lead 52 is provided with a ring 53 thereon. The tubular section 51 has a constricted portion 54 that preferably has a tapered portion 55 similar in contour with the bottom 56 of a porcelain ring 57. This insulator 57 is placed around the lead-in 52 and the lead-in dropped in place after the porcelain is coated with a glass sealing material. The lead-in construction is then heated and sealed together and the top porcelain ring 58 is put in place. While the structure is being heated, a tool is placed on top of the tubular extension 51 and spins or swages the upper portion 59 down over the top of the porcelain. The assembly is then permitted to cool and the glaze hardens or sets. The top portion need not be glazed.

I have previously described a preferred sealing metal as being a nickel-cobalt-iron alloy and also the glass as being a boro-silicate type, because these substances have a similar coefficient of expansion substantially in the region of 4.6 to 7.0 x $10^{-6}$ centimeters per degree centigrade. I also desire to utilize ceramic material such as porcelain of a substantially similar coefficient of expansion. One such type of porcelain is composed of 30% feldspar, 25% flint, and 45% clay. A typical chemical analysis of a particular type of this porcelain known as "Derry plastic body" gives:

|  | Per cent |
|---|---|
| $SiO_2$ | 70.97 |
| $Al_2O_3$ | 23.15 |
| $Fe_2O_3$ | 0.39 |
| $TiO_2$ | 0.76 |
| $CaO$ | 0.12 |
| $MgO$ | 0.14 |
| $Na_2O$ | 1.09 |
| $K_2O$ | 3.30 |

Figure 5:
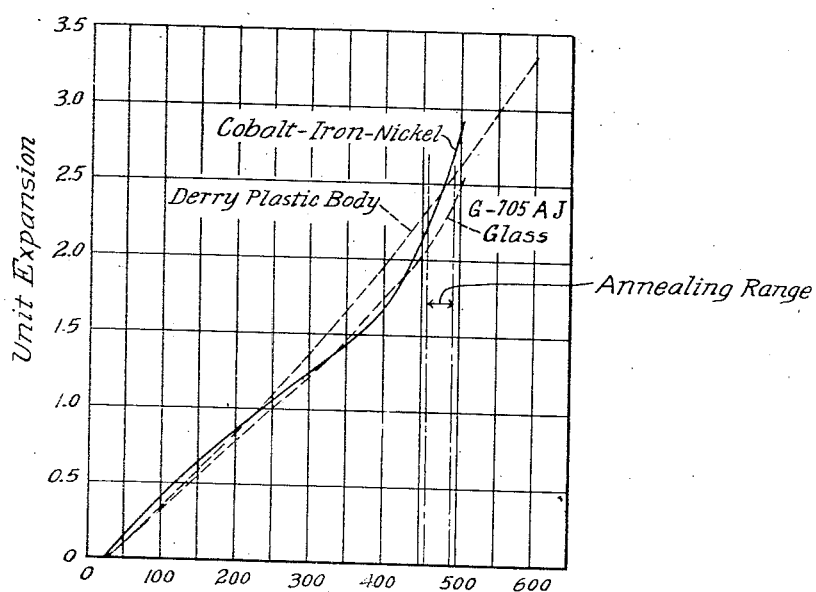

In Figs. 4 and 5, I have disclosed curves showing the unit expansion over a temperature range for the various preferred materials. Fig. 4 has a curve for a special Derry body of porcelain in which pyrophyllite was substituted for the flint in the Derry plastic body, whose curve is illustrated in Fig. 5.

The metals, porcelains and glasses do not necessarily have to have the same coefficient of expansion throughout the temperature, but do have to have substantially the same coefficient of expansion in the annealing range of the glass, as illustrated in Figs. 4 and 5. If the sealing has taken place, for example, in the temperature of 800° to 1100° C., the assembly is cooled to the annealing range of the glass and any stresses developed due to the difference of expansion as the different parts cool, are then relieved because the glass, although set, is still plastic enough to relieve stresses. The time required for this annealing will depend upon the exact type of glass, the temperature at which it is held, and how closely the various materials match in the higher temperature range. This time will, in general, be from a few minutes to four hours. The seal may then be rapidly cooled and only care taken that thermal gradients do not crack the porcelain.

The annealing range of the glass covers the temperature region from the strain point to the annealing point. The strain point is defined as that temperature at which practically all stresses (90% or better) are relieved in a period of four hours. The annealing point is defined as that temperature at which practically all stresses are relieved in fifteen minutes.

The porcelains and glasses are of brittle type materials which are stronger in compression than tension. It is accordingly desirable that the metal should have a slightly higher unit expansion in the annealing range so that after the seals have been annealed and are cooled, the metal contracts slightly more than the porcelain and tends to clamp on the porcelain putting it slightly in compression. Other types of porcelain with the desired coefficient of expansion may, of course, be utilized.

Although I have shown and described the invention applied to discharge tubes, many other applications of my invention are possible; such applications including bushing or lead-in for condensers, especially where such bushings must be oil or air-tight, electrical lead-in for hermetically sealed refrigerators, lead-in bushings for sealed oil-filled transformers, lead-in for motors having a special cooling atmosphere, such as hydrogen, etc. This list is to be taken as illustrative and not as a limiting list.

Also, although I have described various modifications of my invention, various changes may be made in the shape, arrangement, selection and application of the various elements and combinations disclosed. I accordingly desire only such limitations to be placed on the following claims as are necessitated by the prior art.

I claim as my invention:

The method of assembling a vacuum-tight insulated electrical lead-in construction in a metal casing having unsealed joints and a lead conductor which comprises assembling an insulating means more refractory than glass in substantially fixed relation to said casing and a conductor closing the joints of the metal casing vacuum-tight by heating the entire assembly beyond the annealing range of glass and then sealing said conductor and insulating means vacuum-tight by inserting glass between said insulating means and a part of said casing and conductor while said assembly is still above the annealing range of said glass.

WALTER E. BAHLS.